US012511991B2

(12) United States Patent
Kim

(10) Patent No.: US 12,511,991 B2
(45) Date of Patent: Dec. 30, 2025

(54) APPARATUS FOR PREDICTING TRAFFIC INFORMATION AND METHOD THEREOF

(71) Applicants: Hyundai Motor Company, Seoul (KR); Kia Corporation, Seoul (KR)

(72) Inventor: Tae Heon Kim, Siheung-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 452 days.

(21) Appl. No.: 17/896,559

(22) Filed: Aug. 26, 2022

(65) Prior Publication Data

US 2023/0245555 A1 Aug. 3, 2023

(30) Foreign Application Priority Data

Jan. 28, 2022 (KR) ........................ 10-2022-0013585

(51) Int. Cl.
*G08G 1/01* (2006.01)
*G08G 1/052* (2006.01)

(52) U.S. Cl.
CPC ......... *G08G 1/0133* (2013.01); *G08G 1/0112* (2013.01); *G08G 1/0129* (2013.01); *G08G 1/0145* (2013.01); *G08G 1/052* (2013.01)

(58) Field of Classification Search
CPC .. G08G 1/0133; G08G 1/0104; G08G 1/0112; G08G 1/0145; G01C 21/3492; B60W 2554/406; B60W 2554/408
See application file for complete search history.

(56) References Cited

U.S. PATENT DOCUMENTS

| | | | | |
|---|---|---|---|---|
| 2018/0174447 A1* | 6/2018 | Pellolio | .................. | G08G 1/052 |
| 2018/0286220 A1* | 10/2018 | Fowe | ............... | G08G 1/096816 |
| 2021/0012651 A1* | 1/2021 | Park | ..................... | G08G 1/0129 |
| 2023/0196913 A1* | 6/2023 | Shnaider | .............. | G08G 1/0141 701/428 |

FOREIGN PATENT DOCUMENTS

KR 10-2016-0066461 A 6/2016

* cited by examiner

*Primary Examiner* — Kenneth J Malkowski

(74) *Attorney, Agent, or Firm* — Morgan Lewis & Bockius LLP

(57) ABSTRACT

A traffic information predicting apparatus and a method thereof may include a communication module for receiving vehicle data from vehicles that are driving in a specified section and at least one processor electrically connected to the communication module. The at least one processor may obtain a driving speed deviation value of the vehicles and an average driving speed of the vehicles based on the vehicle data received through the communication module, may determine a traffic situation type based on the driving speed deviation value and the average driving speed, and may generate prediction traffic information based on the determined traffic situation type.

18 Claims, 7 Drawing Sheets

APPARATUS FOR PREDICTING TRAFFIC INFORMATION AND METHOD THEREOF

CROSS-REFERENCE TO RELATED APPLICATION

The present application claims priority to Korean Patent Application No. 10-2022-0013585, filed on Jan. 28, 2022, the entire contents of which is incorporated herein for all purposes by this reference.

BACKGROUND OF THE PRESENT DISCLOSURE

Field of the Present Disclosure

The present disclosure relates to an apparatus for collecting traffic information and a method for providing traffic information using the same, and more particularly, relates to a technology of distinguishing between a stop by a traffic signal and an actual traffic congestion situation by reflecting characteristics of traffic information, and detecting the actual traffic congestion situation in advance.

Description of Related Art

In general, a navigation system may calculate its own location by receiving a location signal from a plurality of global positioning system (GPS) satellites, may search for a route from the calculated location to a destination entered by a user, may map the location, which is continuously determined, onto a map, and may guide the route.

Various routes are present from a current location to the destination entered by the user. Accordingly, a selection condition needs to be entered to select one of the various routes. In the instant case, a highway priority, a national road priority, or a shortest distance is generally used as a route selection condition. In the instant case, because a traffic situation on the selected route is unknown, when delay or traffic congestion occurs on the route, a driver spends a lot of time on the road.

Accordingly, nowadays, it is possible to provide more route selection methods by selecting a route by reflecting real-time traffic information together with route selection for each road type or distance. Accordingly, it is possible to minimize driving costs and time costs, to prevent the concentration of traffic on a limited road, and to distribute vehicles as much as possible, increasing road efficiency.

In the meantime, to reflect real-time traffic information, it is necessary to collect probe vehicle data (PVD). The PVD is collected through vehicle to everything (V2X) communication. Each vehicle transmits its own PVD to a road side unit (RSU) provided on a roadside by using the V2X communication, and then the collected information is processed and used to provide transportation services.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a traffic information collecting apparatus of distinguishing between a stop by a traffic signal and an actual traffic congestion situation by reflecting traffic information characteristics of a road, and a method for providing traffic information using the same.

Various aspects of the present disclosure are directed to providing a traffic information collecting apparatus of detecting an actual traffic congestion situation in advance by reflecting traffic information characteristics of a road, and a method for providing traffic information using the same.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a traffic information predicting apparatus may include a communication module for receiving vehicle data from vehicles that are driving in a specified section and at least one processor electrically connected to the communication module. The at least one processor may obtain a driving speed deviation value of the vehicles and an average driving speed of the vehicles based on the vehicle data received through the communication module, may determine a traffic situation type based on the driving speed deviation value and the average driving speed, and may generate prediction traffic information based on the determined traffic situation type.

In an exemplary embodiment of the present disclosure, the traffic information predicting apparatus may further include a memory for storing information related to a link of the specified section. The at least one processor may match a location of each of the vehicles with the link based on the information related to the link and may obtain the driving speed deviation value of the vehicles and the average driving speed of the vehicles based on the location of each of the vehicles.

In an exemplary embodiment of the present disclosure, the traffic situation type may include a first type, a second type, and a third type. The at least one processor is configured to determine that the traffic situation type is one of the first type, the second type, and the third type, based on a change in the driving speed deviation value and the average driving speed.

In an exemplary embodiment of the present disclosure, the at least one processor is configured to determine that the traffic situation type is the second type, when the driving speed deviation value is decreased in a state where the traffic situation type is the first type, and may determine that the traffic situation type is the third type, when the driving speed deviation value is increased in a state where the traffic situation type is the second type.

In an exemplary embodiment of the present disclosure, the first type may include a stable state type in which a traffic situation is smooth. The second type may include a traffic congestion increase type in which traffic congestion is increased. The third type may include a smooth recovery type in which a traffic situation is congested and then is smooth.

In an exemplary embodiment of the present disclosure, the at least one processor is configured to determine that a traffic state is a smooth traffic state, when the driving speed deviation value is not less than a threshold value, and may determine that the traffic state is a delay state, when the driving speed deviation value is less than the threshold value.

In an exemplary embodiment of the present disclosure, the at least one processor is configured to output the traffic situation type when at least one of the driving speed deviation value and the average driving speed or an actual traffic situation of the vehicles is entered through a machine learning model. The actual traffic situation of the vehicles may include a number of times that the vehicles wait for traffic signals, and a speed other than waiting for traffic signals.

In an exemplary embodiment of the present disclosure, the at least one processor may compare a first traffic information prediction result, which is obtained based on a history of a driving speed for the specified section, with the determined traffic situation type, after the traffic situation type is determined, and may generate the prediction traffic information based on a result of the comparison.

In an exemplary embodiment of the present disclosure, the at least one processor may correct the first traffic information prediction result and may generate the prediction traffic information when the first traffic information prediction result is different from the determined traffic situation type, and may generate the prediction traffic information by use of the first traffic information prediction result when the first traffic information prediction result is not different from the determined traffic situation type.

In an exemplary embodiment of the present disclosure, the at least one processor is configured to output the prediction traffic information when the determined traffic situation type, a current average driving speed for the specified section, a past average driving speed for the specified section, and a future average driving speed for the specified section are entered through a machine learning model.

In an exemplary embodiment of the present disclosure, the at least one processor is configured to determine a stop situation by a traffic signal, which is distinguished from an actual traffic congestion situation, by analyzing the driving speed deviation value of the vehicles and a change in the average driving speed of the vehicles.

In an exemplary embodiment of the present disclosure, the at least one processor is configured to determine the generated prediction traffic information as input data when predicting traffic information related to medium distance or a long distance longer than the medium distance.

In an exemplary embodiment of the present disclosure, the at least one processor is configured to predict a remaining time, in which traffic congestion lasts, depending on a traffic congestion degree of the specified section when the traffic situation is a traffic congestion increase situation.

According to an aspect of the present disclosure, a method for predicting traffic information may include obtaining, by at least one processor, a driving speed deviation value of vehicles and an average driving speed of the vehicles based on vehicle data received from the vehicles driving in a specified section through a communication module receiving the vehicle data, determining, by the at least one processor, a traffic situation type based on the driving speed deviation value and the average driving speed, and generating, by the at least one processor, prediction traffic information based on the determined traffic situation type.

In an exemplary embodiment of the present disclosure, the obtaining of the driving speed deviation value of the vehicles and the average driving speed of the vehicles may include matching, by the at least one processor, a location of each of the vehicles with a link based on information related to the link of the specified section stored in a memory and obtaining, by the at least one processor, the driving speed deviation value of the vehicles and the average driving speed of the vehicles based on the location of each of the vehicles.

In an exemplary embodiment of the present disclosure, the traffic situation type may include a first type, a second type, and a third type. The determining of the traffic situation type may include determining, by the at least one processor, the traffic situation type as one of the first type, the second type, and the third type, based on a change in the driving speed deviation value and the average driving speed.

In an exemplary embodiment of the present disclosure, the determining of the traffic situation type may include determining, by the at least one processor, the traffic situation type as the second type when the driving speed deviation value is decreased in a state where the traffic situation type is the first type and determining the traffic situation type as the third type, when the driving speed deviation value is increased in a state where the traffic situation type is the second type.

In an exemplary embodiment of the present disclosure, the first type may include a stable state type in which a traffic situation is smooth. The second type may include a traffic congestion increase type in which traffic congestion is increased. The third type may include a smooth recovery type in which a traffic situation is congested and then is smooth.

In an exemplary embodiment of the present disclosure, the generating of the prediction traffic information may include comparing, by the at least one processor, a first traffic information prediction result, which is obtained based on a history of a driving speed for the specified section, with the determined traffic situation type, after the traffic situation type is determined and generating the prediction traffic information based on a result of the comparison.

In an exemplary embodiment of the present disclosure, the method for predicting traffic information may further include determining, by the at least one processor, a stop situation by a traffic signal, which is distinguished from an actual traffic congestion situation, by analyzing the driving speed deviation value of the vehicles and a change in the average driving speed of the vehicles.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
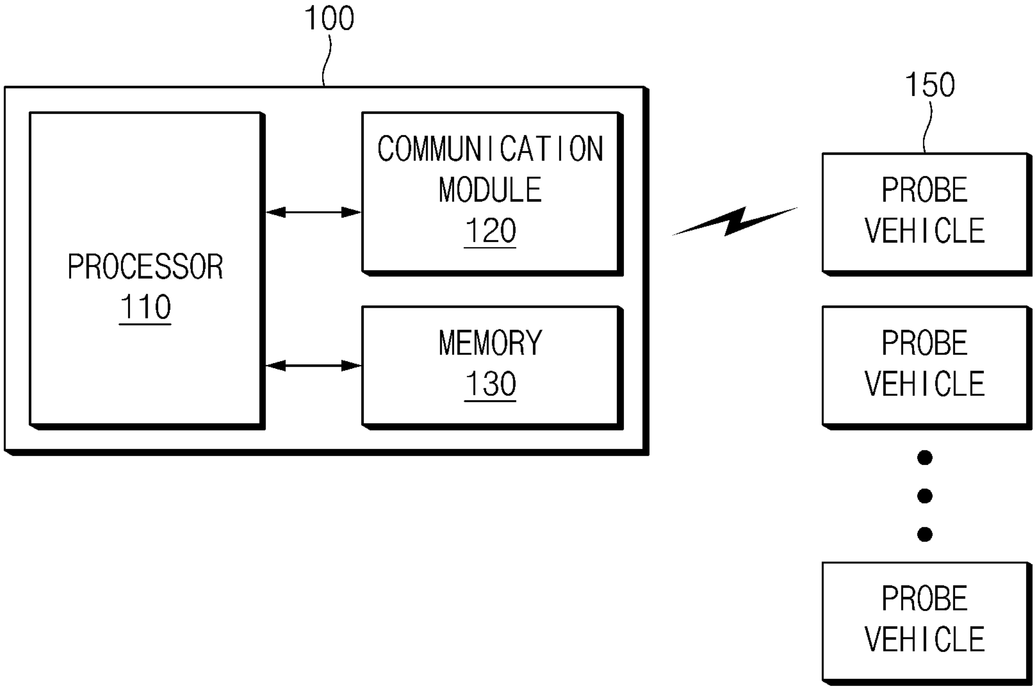
FIG. 1 is a block diagram of a traffic information predicting apparatus, according to an exemplary embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, various exemplary embodiments of the present disclosure will be described in detail with reference to the exemplary drawings. In adding the reference numerals to the components of each drawing, it should be noted that the identical or equivalent component is designated by the identical numeral even when they are displayed on other drawings. Furthermore, in describing the exemplary embodiment of the present disclosure, a detailed description of well-known features or functions will be ruled out in order not to unnecessarily obscure the gist of the present disclosure.

In describing the components of the exemplary embodiment according to an exemplary embodiment of the present disclosure, terms such as first, second, “A”, “B”, (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Hereinafter, various embodiments of the present disclosure will be described in detail with reference to FIGS. 1 to 6.

FIG. 1 is a block diagram of a traffic information predicting apparatus 100, according to an exemplary embodiment of the present disclosure.

Referring to FIG. 1, the traffic information predicting apparatus 100 according to various exemplary embodiments of the present disclosure may include a processor 110, a communication module 120, and a memory 130.

In various exemplary embodiments of the present disclosure, the traffic information predicting apparatus 100 may further include additional components in addition to the components illustrated in FIG. 1, or may omit at least one of the components illustrated in FIG. 1.

According to an exemplary embodiment of the present disclosure, the processor 110 may be electrically connected to the communication module 120 and the memory 130, may electrically control each of the components, may be an electrical circuit that executes instructions of software, and may perform various data processing and calculation described below.

The processor 110 may include, for example, an electronic control unit (ECU), a micro controller unit (MCU), or another sub-controller, which is mounted on a vehicle.

According to an exemplary embodiment of the present disclosure, the processor 110 may perform data processing or a determination associated with a control and/or a communication of at least one other component(s) of the traffic information predicting apparatus 100 by use of instructions stored in the memory 130. Specific details related to an operation of the processor 110 will be described later with reference to FIGS. 3 and 6.

According to an exemplary embodiment of the present disclosure, the communication module 120 may be a module that provides a communication interface with a probe vehicle 150 thus being driving, and may periodically receive probe data from the probe vehicle 150.

According to an exemplary embodiment of the present disclosure, the communication module 120 may receive vehicle data from the probe vehicles 150 that are driving in a specified section. For example, the specified section may include a specific section of a road on which the vehicle is driving.

According to an exemplary embodiment of the present disclosure, the probe data received by the communication module 120 from the probe vehicle 150 may include identification information (ID), a driving speed, a location (e.g., a Global Positioning System (GPS) location), a length of a preceding vehicle, an interval between the probe vehicle 150 and the preceding vehicle, and an interval between the probe vehicle 150 and a following vehicle.

According to an exemplary embodiment of the present disclosure, the probe vehicle 150 may be provided with a telematics terminal as a vehicle terminal. Furthermore, the probe vehicle 150 may obtain information related to a distance from the preceding vehicle through a front sensor, may obtain information related to a distance from the following vehicle through a rear sensor, and may obtain information related to a length of the preceding vehicle through the front camera. At the instant time, the probe vehicle 150 may distinguish a vehicle type (a passenger vehicle, a van, SUV, a truck, or the like) according to a rear shape of the preceding vehicle or a side shape of the preceding vehicle.

According to an exemplary embodiment of the present disclosure, the communication module 120 may include at least one of a mobile communication module, a wireless Internet module, and a short-distance communication module to communicate with the probe vehicle 150.

According to an exemplary embodiment of the present disclosure, a mobile communication module may communicate with the probe vehicle 150 through a mobile communication network established depending on technical standards or communication methods (e.g., global system for mobile communication (GSM), code division multi access (CDMA), code division multi access 2000 (CDMA2000), enhanced voice-data optimized or enhanced voice-data only (EV-DO), wideband CDMA (WCDMA), high speed downlink packet access (HSDPA), high speed uplink packet access (HSUPA), long term evolution (LTE), long term evolution-advanced (LTE-A), and the like) for mobile communication, 4th generation mobile telecommunication (4G), and 5th generation mobile telecommunication (5G).

According to an exemplary embodiment of the present disclosure, the wireless Internet module may be a module for wireless Internet access and may communicate with the probe vehicle 150 through wireless LAN (WLAN), Wireless-Fidelity (Wi-Fi), Wi-Fi Direct, digital living network alliance (DLNA), wireless broadband (WiBro), Worldwide Interoperability for Microwave Access (WiMAX), high speed downlink packet access (HSDPA), high speed uplink packet access (HSUPA), long term evolution (LTE), long term evolution-advanced (LTE-A), and the like.

According to an exemplary embodiment of the present disclosure, short range communication module may be used to support short-range communication by use of at least one of technologies such as Bluetooth™, radio frequency identification (RFID), infrared data association (IrDA), ultra wideband (UWB), ZigBee, near field communication (NFC), and wireless universal serial bus (Wireless USB).

According to an exemplary embodiment of the present disclosure, the memory 130 may store data and/or an algorithm required to operate the traffic information predicting apparatus 100.

According to an exemplary embodiment of the present disclosure, the memory 130 may store probe data received from the probe vehicle 150. For example, the probe data includes identification information (ID) of the probe vehicle 150, a driving speed, a location (e.g., a GPS location), a length of a preceding vehicle, an interval between the probe vehicle 150 and the preceding vehicle, and an interval between the probe vehicle 150 and a following vehicle.

According to an exemplary embodiment of the present disclosure, the memory 130 may include a storage medium such as a random access memory (RAM), a static random access memory (SRAM), a read-only memory (ROM), a programmable read-only memory (PROM), or an electrically erasable programmable read-only memory (EEPROM).

Figure 2:
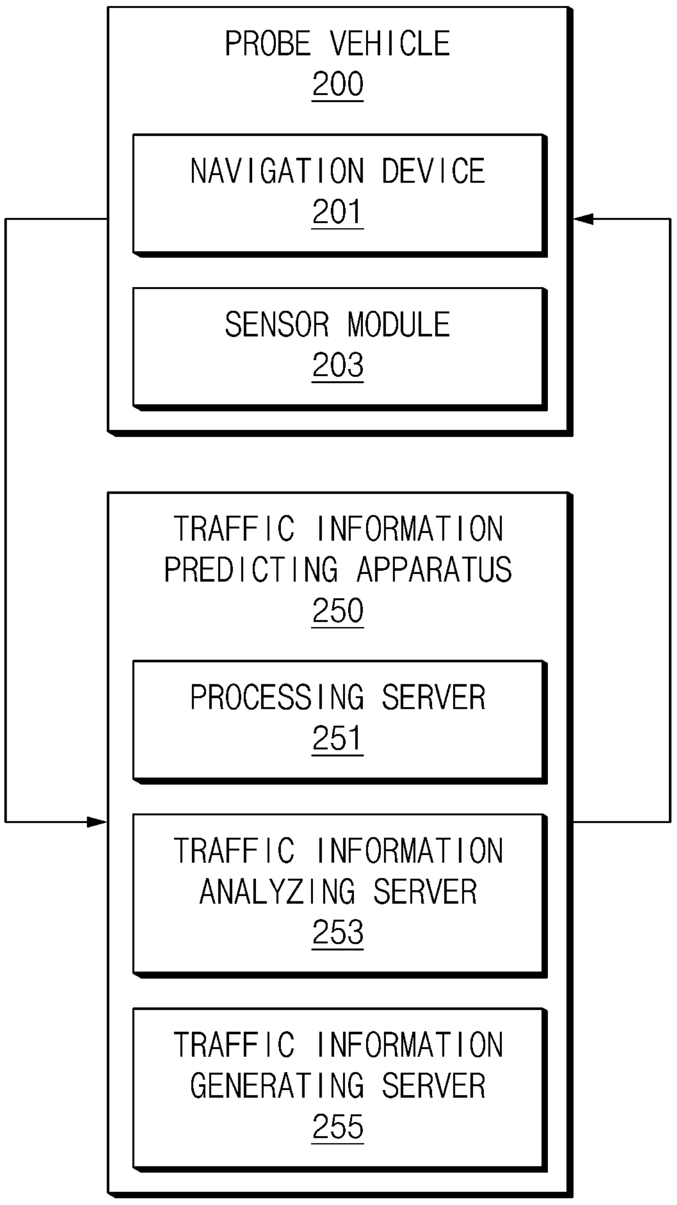
FIG. 2 illustrates that the traffic information predicting apparatus collects data of a vehicle and predicts traffic information, according to an exemplary embodiment of the present disclosure.

FIG. 2 illustrates that the traffic information predicting apparatus 250 collects data of a vehicle and predicts traffic information, according to an exemplary embodiment of the present disclosure.

Referring to FIG. 2, according to an exemplary embodiment of the present disclosure, prediction of traffic information in a traffic information predicting apparatus 250 may be performed through a processing server 251, a traffic information analyzing server 253, and the traffic information generating server 255.

According to an exemplary embodiment of the present disclosure, at least one processor may be electrically connected to the processing server 251, the traffic information analyzing server 253, and the traffic information generating server 255 to electrically control each component.

In various exemplary embodiments of the present disclosure, the traffic information predicting apparatus 100 may further use an additional component in addition to the components illustrated in FIG. 2, or may be performed while at least one of the components illustrated in FIG. 2 is omitted.

Referring to FIG. 2, the traffic information predicting apparatus 250 according to various exemplary embodiments of the present disclosure may receive data (e.g., probe data) from a probe vehicle 200 through a communication module.

According to an exemplary embodiment of the present disclosure, the traffic information predicting apparatus 250 may periodically receive data from the probe vehicle 200.

For example, the traffic information predicting apparatus 250 may periodically receive real-time location information (e.g., GPS location information) of the probe vehicle 200 from the probe vehicle 200.

According to an exemplary embodiment of the present disclosure, the location information of the probe vehicle 200 may be obtained through a sensor module 203 provided in the probe vehicle 200 and may be received by the traffic information predicting apparatus 250.

According to an exemplary embodiment of the present disclosure, the processing server 251 may process a driving speed of each of the probe vehicles 200 and an average driving speed of the probe vehicles 200 by use of data (e.g., location data) received from the probe vehicles 200.

For example, the average driving speed may mean an average value of driving speeds of the probe vehicles 200 in a link of a specified section during a specific period.

According to an exemplary embodiment of the present disclosure, the traffic information analyzing server 253 may obtain the driving speed of each of the probe vehicles 200 and the average driving speed of the probe vehicles 200, which are processed from the processing server 251.

According to an exemplary embodiment of the present disclosure, the traffic information analyzing server 253 may analyze (or determine) a driving speed deviation value of the probe vehicles 200 by use of the processed driving speed of each of the probe vehicles 200.

According to an exemplary embodiment of the present disclosure, the traffic information analyzing server 253 may analyze a traffic situation type by use of the driving speed deviation value of the probe vehicles 200 and the average driving speed of the probe vehicles 200.

According to an exemplary embodiment of the present disclosure, the traffic situation type may include a first type, a second type, and a third type. For example, the first type may be a stable state type in which a traffic situation is smooth. Furthermore, for example, the second type may be a traffic congestion increase type in which traffic congestion is increased. Moreover, for example, the third type may be a smooth recovery type in which a traffic situation is congested and then is smooth again.

In an exemplary embodiment, the traffic situation is smooth when the traffic congestion is not increased or is in a predetermined range.

According to an exemplary embodiment of the present disclosure, when the driving speed deviation value of the probe vehicles 200, the average driving speed of the probe vehicles 200, and the actual traffic situation of the probe vehicles 200 are entered through machine learning, the traffic information analyzing server 253 may generate a first model, in which a traffic situation type is output. For example, the actual traffic situation of the probe vehicles 200 may include the number of times that the probe vehicles 200 wait for traffic signals, and a speed other than waiting for traffic signals.

According to an exemplary embodiment of the present disclosure, the traffic information analyzing server 253 may determine the traffic situation type through the first model.

According to an exemplary embodiment of the present disclosure, after the traffic situation type is determined, the traffic information analyzing server 253 may compare a first traffic information prediction result obtained based on a history of driving speeds of the probe vehicles 200 with the determined traffic situation type and may correct the first traffic information prediction result based on a result of the comparison.

According to an exemplary embodiment of the present disclosure, when the first traffic information prediction result is different from the determined traffic situation type, the traffic information analyzing server 253 may correct the first traffic information prediction result based on the determined traffic situation type.

According to an exemplary embodiment of the present disclosure, the traffic information generating server 255 may generate prediction traffic information by use of the first traffic information prediction result corrected based on the traffic situation type.

According to an exemplary embodiment of the present disclosure, when the first traffic information prediction result is not different from the determined traffic situation type, the traffic information generating server 255 may generate the predicted traffic information without correcting the first traffic information prediction result, by use of the first traffic information prediction result.

According to an exemplary embodiment of the present disclosure, when the determined traffic situation type, a current average driving speed for a specified section, a past average driving speed for the specified section, and a future average driving speed for the specified section are entered through machine learning, the traffic information analyzing server 253 may generate a second model, in which prediction traffic information is output. According to an exemplary embodiment of the present disclosure, the traffic information analyzing server 253 may generate prediction traffic information through the second model.

According to an exemplary embodiment of the present disclosure, the traffic information generating server 255 may transmit the generated prediction traffic information to a navigation device 201 provided in each of the probe vehicles 200 through a communication module.

According to an exemplary embodiment of the present disclosure, the navigation device 201 provided in each of the probe vehicles 200 may display a color corresponding to a traffic situation type through a display.

For example, colors corresponding to the first type, the second type, and the third type may be green, orange, and red, respectively. However, an exemplary embodiment of the present disclosure is not limited thereto, and a color corresponding to each type may be set in various ways.

Figure 3:
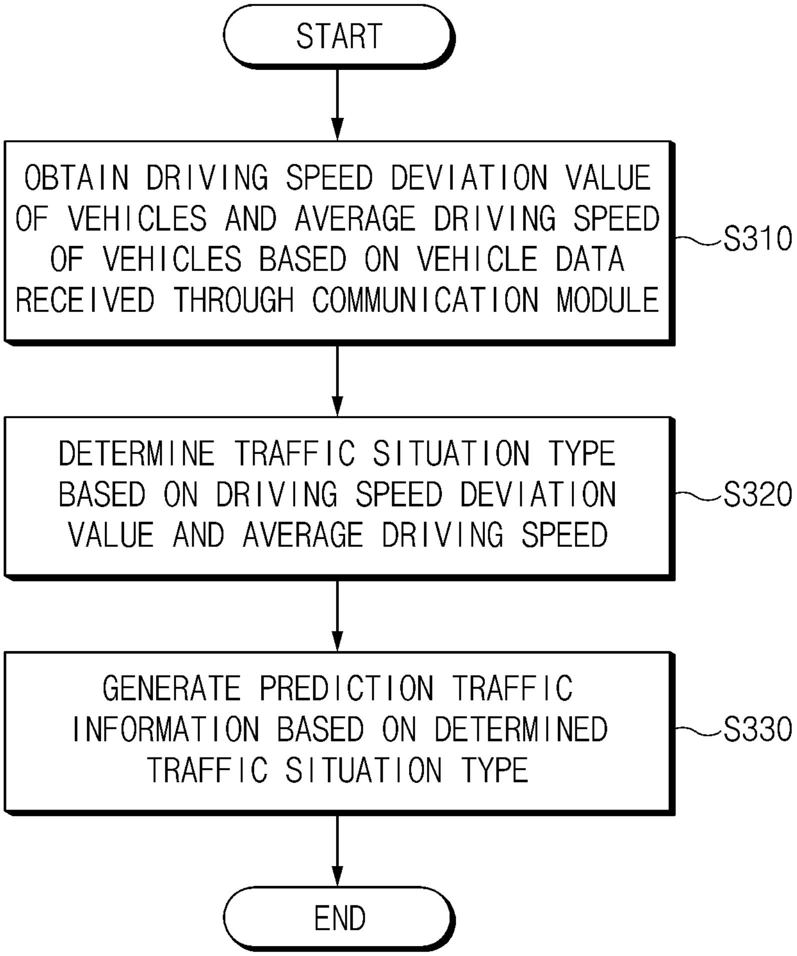
FIG. 3 is a flowchart illustrating a traffic information prediction method, according to an exemplary embodiment of the present disclosure.

FIG. 3 is a flowchart illustrating a traffic information prediction method, according to an exemplary embodiment of the present disclosure.

In the following embodiment, operation S310 to operation S330 may be sequentially performed, but are not necessarily performed sequentially. For example, the order of operations may be changed, and at least two operations may be performed in parallel.

Referring to FIG. 3, in a traffic information predicting apparatus and method according to an exemplary embodiment of the present disclosure, a processor may obtain a driving speed deviation value of vehicles and an average driving speed of vehicles based on vehicle data received through a communication module (S310).

According to an exemplary embodiment of the present disclosure, the processor may receive real-time location information (or current location information) of each of the vehicles through the communication module. For example, the processor may receive real-time location information of each of the vehicles, which is obtained from a GPS sensor provided in each of the vehicles, through the communication module.

According to an exemplary embodiment of the present disclosure, the processor may periodically receive a vehicle's real-time location information through the communication module.

According to an exemplary embodiment of the present disclosure, the processor may obtain (or process) the driving speed of each of the vehicles and the average driving speed of the vehicles based on the received location information.

According to an exemplary embodiment of the present disclosure, the processor may obtain the driving speed of each of the vehicles and the average driving speed of the vehicles at a real-time location. For example, the average driving speed may mean an average value of driving speeds of vehicles in a link of a specified section during a specific period.

According to an exemplary embodiment of the present disclosure, the processor may obtain a driving speed deviation value of vehicles based on the driving speed at the current location of each of the vehicles.

According to an exemplary embodiment of the present disclosure, the processor is configured to determine a traffic situation type based on the driving speed deviation value and the average driving speed (S320).

According to an exemplary embodiment of the present disclosure, when the driving speed deviation value of vehicles, the average driving speed of vehicles, and an actual traffic situation of vehicles are entered through machine learning, the processor may generate a first model, in which the traffic situation type is output.

For example, the actual traffic situation of the vehicles may include the number of times that the vehicles wait for traffic signals, and a speed other than waiting for traffic signals. According to an exemplary embodiment of the present disclosure, the processor may obtain a traffic situation by use of the first model.

According to an exemplary embodiment of the present disclosure, the processor is configured to determine that the traffic situation type is one of the first type, the second type, or the third type, by use of the first model.

According to an exemplary embodiment of the present disclosure, when a driving speed deviation value is not clearly changed, the processor is configured to determine that the traffic situation corresponds to the first type.

For example, when it is not determined that the driving speed deviation value tends to decrease, and is not determined that the driving speed deviation value tends to increase, the processor is configured to determine that the traffic situation corresponds to the first type.

According to an exemplary embodiment of the present disclosure, when it is determined that the driving speed deviation value tends to decrease, the processor is configured to determine that the traffic situation type corresponds to the second type.

In detail, when the driving speed deviation value is gradually decreased in a state where the traffic situation type corresponds to the first type, the processor is configured to determine that the traffic situation type corresponds to the second type.

According to an exemplary embodiment of the present disclosure, when it is determined that the driving speed deviation value is increased, the processor is configured to determine that the traffic situation type corresponds to the second type.

In detail, when the driving speed deviation value is gradually increased in a state where the traffic situation type corresponds to the second type, the processor is configured to determine that the traffic situation type corresponds to the third type.

For example, the first type may be a stable state type in which a traffic situation is smooth. Furthermore, for example, the second type may be a traffic congestion increase type in which traffic congestion is increased. Moreover, for example, the third type may be a smooth recovery type in which a traffic situation is congested and then is smooth.

According to an exemplary embodiment of the present disclosure, the processor may generate prediction traffic information based on the determined traffic situation type (S330).

According to an exemplary embodiment of the present disclosure, the processor may generate the prediction traffic information based on determining that the traffic situation corresponds to one of the first type, second type or third type.

According to an exemplary embodiment of the present disclosure, after the traffic situation type is determined, the processor may compare a first traffic information prediction result (or a first traffic information prediction value) obtained based on a history of a driving speed for a specified section with the determined traffic situation type.

According to an exemplary embodiment of the present disclosure, the processor may generate prediction traffic information based on a result of the comparison.

According to an exemplary embodiment of the present disclosure, when the first traffic information prediction result is different from the determined traffic situation type, the processor may correct the first traffic information prediction result.

In detail, when the traffic situation corresponding to the first traffic information prediction result is different from the determined traffic situation type, the processor may correct the first traffic information prediction result. According to an exemplary embodiment of the present disclosure, the processor may generate prediction traffic information by use of the corrected first traffic information prediction result.

According to an exemplary embodiment of the present disclosure, when the first traffic information prediction result is not different from the determined traffic situation type, the processor may not correct the first traffic information prediction result.

In detail, when the traffic situation corresponding to the first traffic information prediction result is not different from the determined traffic situation type, the processor may not correct the first traffic information prediction result.

According to an exemplary embodiment of the present disclosure, the processor may generate prediction traffic information based on the first traffic information prediction result without correcting the first traffic information prediction result.

According to an exemplary embodiment of the present disclosure, when the determined traffic situation type, a current average driving speed for a specified section, a past average driving speed for the specified section, and a future average driving speed for the specified section are entered through machine learning, the processor may generate a second model, in which prediction traffic information is output.

According to an exemplary embodiment of the present disclosure, the processor may obtain prediction traffic information by use of the second model.

Figure 4:
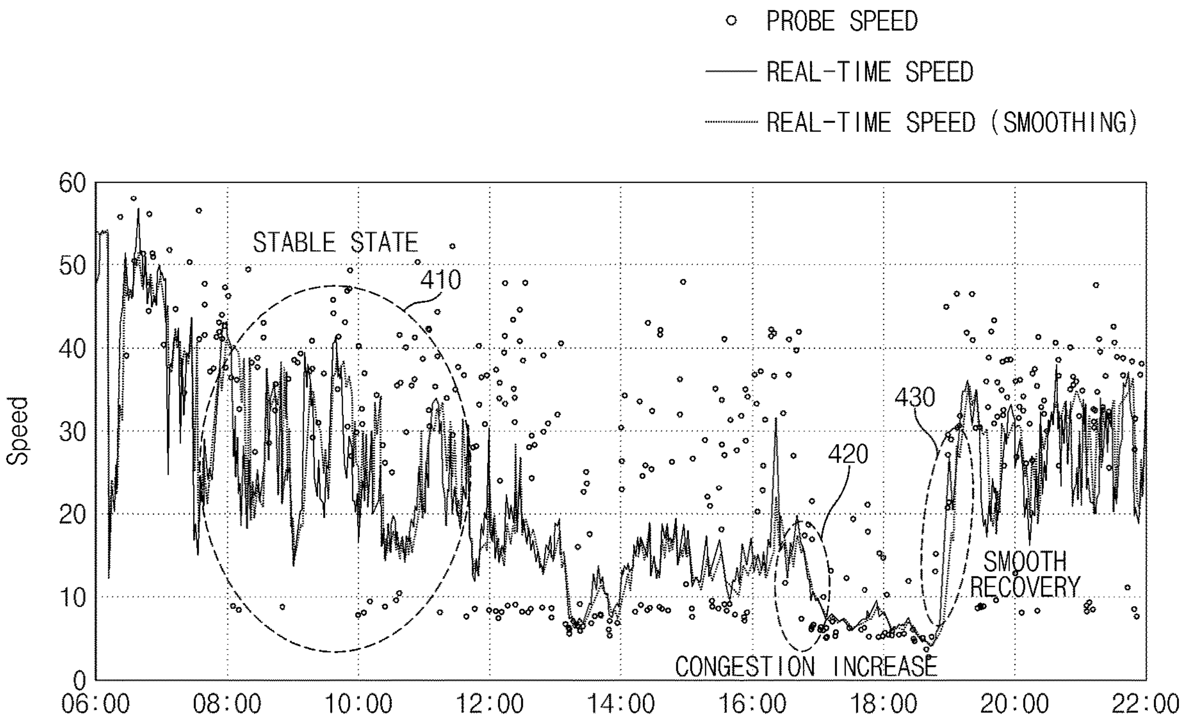
FIG. 4 is a diagram illustrating that an apparatus and method for predicting traffic information classify a traffic situation type based on a driving speed deviation value and an average driving speed of vehicles, according to an exemplary embodiment of the present disclosure.

FIG. 4 is a diagram illustrating that an apparatus and method for predicting traffic information classify a traffic situation type based on a driving speed deviation value and an average driving speed of vehicles, according to an exemplary embodiment of the present disclosure. Descriptions identical to or corresponding to the above-mentioned descriptions provided with reference to FIG. 4 may be briefly described or omitted.

Referring to FIG. 4, in a traffic information predicting apparatus and method according to an exemplary embodiment of the present disclosure, a processor may classify a traffic situation type based on a speed deviation value for each vehicle and an average driving speed.

According to an exemplary embodiment of the present disclosure, the processor is configured to determine that the traffic situation type corresponds to at least one of a first type 410, a second type 420 or a third type 430 by analyzing the speed deviation value and the average driving speed for each vehicle.

According to an exemplary embodiment of the present disclosure, when the driving speed deviation value is great and the driving speed deviation value is not clearly changed, the processor is configured to determine that the traffic situation corresponds to the first type 410.

For example, when the driving speed deviation value is great and it is not determined that the driving speed deviation value tends to increase or decrease, the processor is configured to determine that the traffic situation corresponds to the first type 410.

According to an exemplary embodiment of the present disclosure, even though the average driving speed is small in the first type 410, the processor is configured to determine a stop situation by a traffic signal which is distinguished from an actual traffic congestion situation.

For example, the actual traffic congestion situation may mean a situation in which the number of vehicles including the driving speed less than a specified speed is not less than the specified number.

According to an exemplary embodiment of the present disclosure, when it is determined that the driving speed deviation value tends to decrease, the processor is configured to determine that the traffic situation type corresponds to the second type 420.

In detail, when the driving speed deviation value is gradually decreased in a state where the traffic situation type corresponds to the first type 410, the processor is configured to determine that the traffic situation type corresponds to the second type 420.

According to an exemplary embodiment of the present disclosure, the processor is configured to determine that a traffic situation in the second type 420 is an actual traffic congestion situation which is distinguished from the stop situation by a traffic signal.

According to an exemplary embodiment of the present disclosure, when it is determined that the driving speed deviation value tends to increase, the processor is configured to determine that the traffic situation type corresponds to the third type 430.

In detail, when the driving speed deviation value is gradually increased in a state where the traffic situation type corresponds to the second type 420, the processor is configured to determine that the traffic situation type corresponds to the third type 430.

According to an exemplary embodiment of the present disclosure, when the driving speed deviation value tends to increase and the average driving speed tends to be greater than the average driving speed in the second type 420, the processor is configured to determine that the traffic situation type is the third type 430.

For example, the first type 410 may be a stable state type in which a traffic situation is smooth. Furthermore, for example, the second type 420 may be a traffic congestion increase type in which traffic congestion is increased. Moreover, for example, the third type may be a smooth recovery type in which a traffic situation is congested and then is smooth.

According to the above-described embodiment, the traffic information predicting apparatus according to an exemplary embodiment of the present disclosure may distinguish between a stop by a traffic signal and an actual traffic congestion situation by determining a traffic situation based on a vehicle-specific speed deviation value and an average driving speed.

Figure 5:
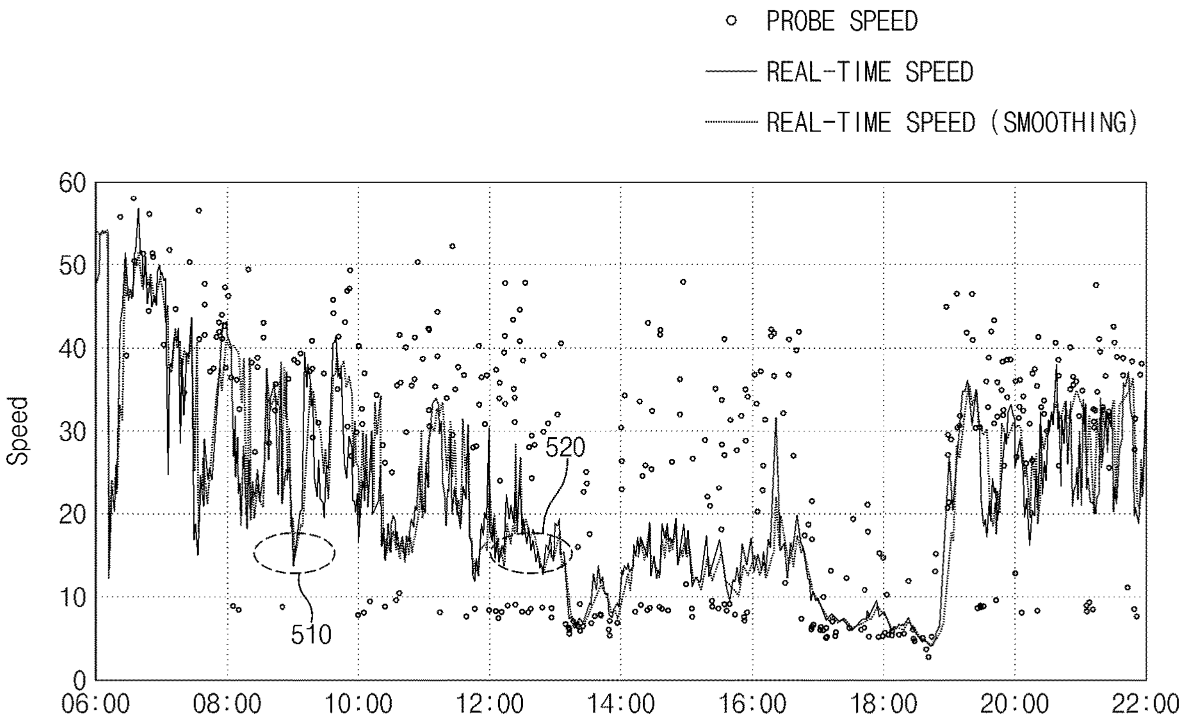
FIG. 5 is a diagram illustrating that an apparatus and method for predicting traffic information determine a traffic situation based on driving speed deviation values of vehicles, according to an exemplary embodiment of the present disclosure.

FIG. 5 is a diagram illustrating that an apparatus and method for predicting traffic information determine a traffic situation based on driving speed deviation values of vehicles, according to an exemplary embodiment of the present disclosure.

Referring to FIG. 5, in the apparatus and method for predicting traffic information according to an exemplary embodiment of the present disclosure, a processor is configured to determine a traffic situation by comparing the driving speed deviation value of vehicles (e.g., probe vehicles) with a threshold value.

According to an exemplary embodiment of the present disclosure, when the driving speed deviation value is not less than the threshold value, the processor is configured to determine the traffic situation as a first traffic situation 510. For example, the first traffic situation 510 may mean a smooth traffic state.

According to an exemplary embodiment of the present disclosure, when the driving speed deviation value is less than the threshold value, the processor is configured to determine the traffic situation as a second traffic situation 520. For example, the second traffic situation 520 may mean a delay state.

According to the above-described embodiment, a traffic information predicting apparatus according to an exemplary embodiment of the present disclosure may differently determine a traffic situation even when the average driving speed is the same, by determining a traffic situation based on the driving speed deviation value of vehicles. Accordingly, accuracy in distinguishing between a stop by a traffic signal and an actual traffic congestion situation may be improved.

Figure 6:
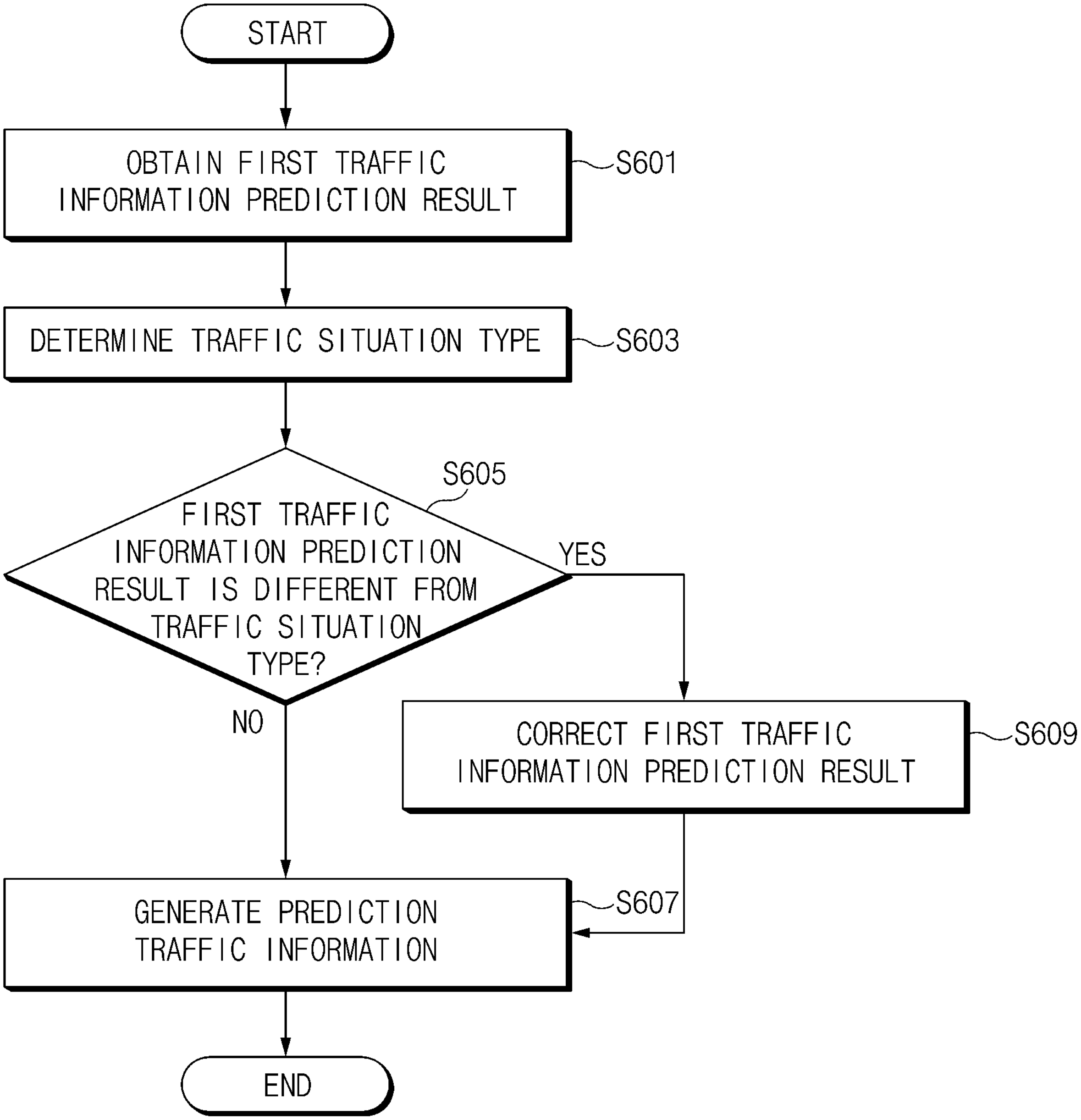
FIG. 6 is a flowchart illustrating that an apparatus and method for predicting traffic information corrects a traffic information prediction result, according to an exemplary embodiment of the present disclosure.

FIG. 6 is a flowchart illustrating that an apparatus and method for predicting traffic information corrects a traffic information prediction result, according to an exemplary embodiment of the present disclosure.

In the following embodiment, operation S601 to operation S609 may be sequentially performed, but are not necessarily performed sequentially. For example, the order of operations may be changed, and at least two operations may be performed in parallel.

Descriptions identical to or corresponding to the above-mentioned descriptions provided with reference to FIG. 6 may be briefly described or omitted.

Referring to FIG. 6, in the traffic information predicting apparatus and method according to an exemplary embodiment of the present disclosure, a processor may obtain a first traffic information prediction result (S601).

According to an exemplary embodiment of the present disclosure, the processor may obtain the first traffic information prediction result based on a history of driving speeds of vehicles.

According to an exemplary embodiment of the present disclosure, the first traffic information prediction result may be obtained based on an average driving speed value of vehicles in a specified section.

According to an exemplary embodiment of the present disclosure, the first traffic information prediction result may not include information related to a driving speed deviation value of vehicles.

According to an exemplary embodiment of the present disclosure, the processor is configured to determine a traffic situation type (S603).

According to an exemplary embodiment of the present disclosure, the processor is configured to determine that a traffic situation corresponds to one of a first type, a second type, or a third type.

According to an exemplary embodiment of the present disclosure, the processor is configured to output the traffic situation type as one of the first type, the second type, or the third type by entering the driving speed deviation value of vehicles, the average driving speed of vehicles, and the actual traffic situation of vehicles through a first model of machine learning.

According to an exemplary embodiment of the present disclosure, the processor is configured to determine whether the first traffic information prediction result is different from the traffic situation type (S605).

According to an exemplary embodiment of the present disclosure, the processor is configured to determine whether a traffic situation corresponding to the first traffic information prediction result is different from the traffic situation type output through the first model.

According to an exemplary embodiment of the present disclosure, when it is determined that the first traffic information prediction result is not different from the traffic situation type, the processor may generate prediction traffic information by use of the first traffic information prediction result (S607).

For example, when the traffic situation corresponding to the first traffic information prediction result is a smooth traffic state, and the traffic situation type output through the first model is the first type (e.g., a stable state type in which a traffic situation is smooth), the processor is configured to determine that the first traffic information prediction result is not different from the traffic situation type.

According to an exemplary embodiment of the present disclosure, when it is determined that the first traffic information prediction result is not different from the traffic situation type, the processor is configured to transmit the prediction traffic information corresponding to the first traffic information prediction result to a navigation device of a vehicle.

According to an exemplary embodiment of the present disclosure, when it is determined that the first traffic information prediction result is different from the traffic situation type, the processor may correct the first traffic information prediction result (S609).

For example, when the traffic situation corresponding to the first traffic information prediction result is a smooth traffic state, and the traffic situation type output through the first model is the second type (e.g., a traffic congestion increase type in which traffic congestion is increased), the processor is configured to determine that the first traffic information prediction result is different from the traffic situation type.

According to an exemplary embodiment of the present disclosure, when it is determined that the first traffic information prediction result is different from the traffic situation type, the processor may correct the first traffic information prediction result based on the output traffic situation type.

According to an exemplary embodiment of the present disclosure, the processor may generate prediction traffic information by use of the corrected first traffic information prediction result (S607).

According to an exemplary embodiment of the present disclosure, when it is determined that the first traffic information prediction result is different from the traffic situation type, the processor is configured to transmit the prediction traffic information corresponding to the corrected first traffic information prediction result to the navigation device of the vehicle.

According to an exemplary embodiment of the present disclosure, when predicting traffic information related to medium or long distances, the processor may use the generated prediction traffic information as input data.

Figure 7:
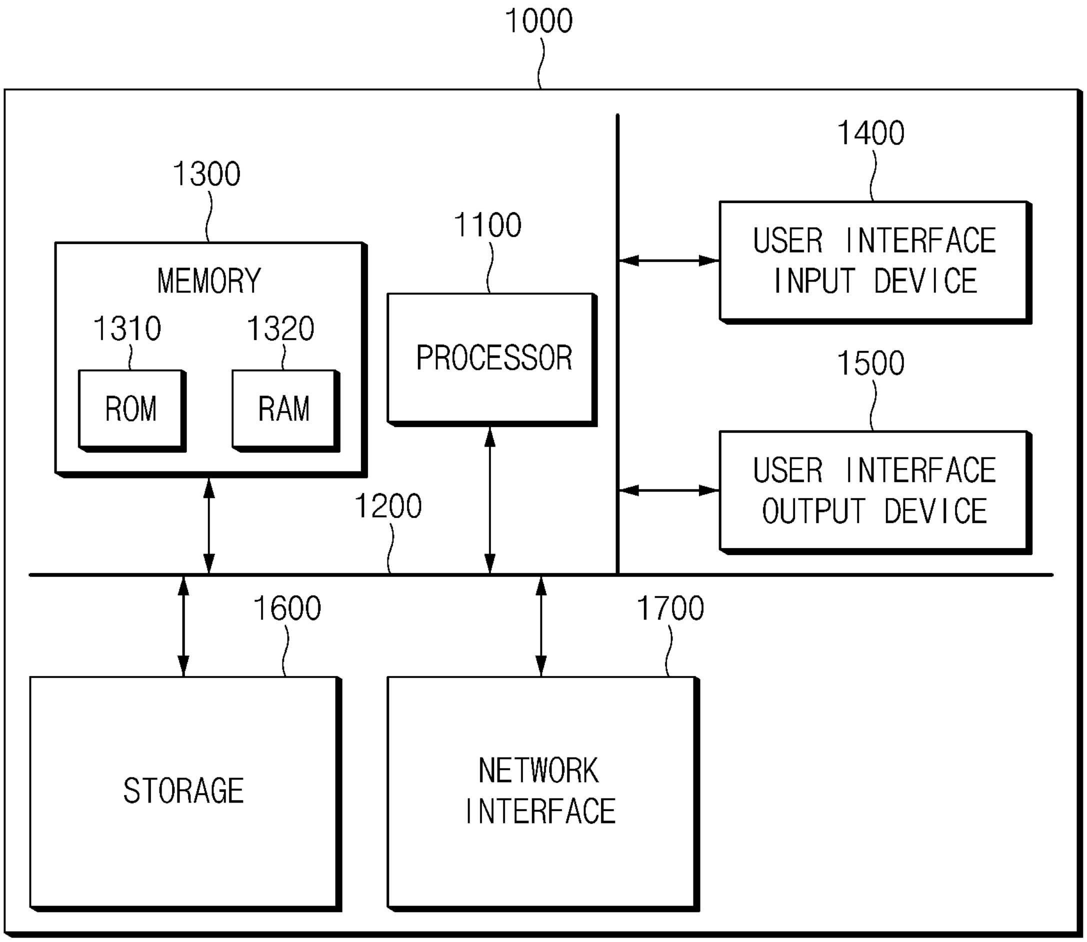
FIG. 7 illustrates a computing system related to a traffic information predicting apparatus and method, according to an exemplary embodiment of the present disclosure.

FIG. 7 illustrates a computing system related to a traffic information predicting apparatus and method, according to an exemplary embodiment of the present disclosure.

Referring to FIG. 7, a computing system 1000 related to a traffic information predicting apparatus and method may include at least one processor 1100, a memory 1300, a user interface input device 1400, a user interface output device 1500, a storage 1600, and a network interface 1700, which are connected to each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a read only memory (ROM) 1310 and a random access memory (RAM) 1320.

Thus, the operations of the method or the algorithm described in connection with the exemplary embodiments included herein may be embodied directly in hardware or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disk, a removable disk, and a CD-ROM.

The exemplary storage medium may be coupled to the processor 1100, and the processor 1100 may read information out of the storage medium and may record information in the storage medium. Alternatively, the storage medium may be integrated with the processor 1100. The processor 1100 and the storage medium may reside in an application specific integrated circuit (ASIC). The ASIC may reside within a user terminal. In another case, the processor 1100 and the storage medium may reside in the user terminal as separate components.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, the exemplary embodiments of the present disclosure are provided to explain the spirit and scope of the present disclosure, but not to limit them, so that the spirit and scope of the present disclosure is not limited by the embodiments. The scope of the present disclosure should be construed based on the accompanying claims, and all the technical ideas within the scope equivalent to the claims should be included in the scope of the present disclosure.

Descriptions of a traffic information predicting apparatus according to an exemplary embodiment of the present disclosure, and a method thereof are as follows.

According to at least one of embodiments of the present disclosure, accuracy in distinguishing between a signal stop and an actual traffic congestion situation may be improved.

Furthermore, according to at least one of embodiments of the present disclosure, it is possible to predict future traffic condition changes based on traffic information, and accuracy in short-term prediction traffic information may be improved.

Moreover, according to at least one of embodiments of the present disclosure, user satisfaction may be improved by determining a traffic situation in real time and improving short-term prediction accuracy.

Besides, a variety of effects directly or indirectly understood through the specification may be provided.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of predetermined exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A traffic information predicting apparatus, comprising:

a communication circuit receiving vehicle data from vehicles that are driving in a specified section; and at least one processor electrically connected to the communication circuit, wherein the at least one processor:

obtains a driving speed deviation value of the vehicles and an average driving speed of the vehicles based on the vehicle data received through the communication circuit;

determines a traffic situation type based on the driving speed deviation value and the average driving speed entered through a machine learning model; and generates prediction traffic information based on the determined traffic situation type; and displays the prediction traffic information and the traffic situation type through a display, wherein the at least one processor compares a first traffic information prediction result, which is obtained based on a history of a driving speed for the specified section, with the determined traffic situation type, after the traffic situation type is determined, and generates the prediction traffic information based on a result of the comparison.

2. The apparatus of claim 1, further including:

a memory electrically connected to the at least one processor and configured to store information related to a link of the specified section, wherein the at least one processor matches a location of each of the vehicles with the link based on the information related to the link and obtains the driving speed deviation value of the vehicles and the average driving speed of the vehicles based on the location of each of the vehicles.

3. The apparatus of claim 1, wherein the traffic situation type includes a first type, a second type, and a third type, and wherein the at least one processor determines that the traffic situation type is one of the first type, the second type, and the third type, based on a change in the driving speed deviation value and the average driving speed.

4. The apparatus of claim 3, wherein the at least one processor determines that the traffic situation type is the second type, based on that the driving speed deviation value decreases below a threshold value in a state where the traffic situation type is the first type, and determines that the traffic situation type is the third type, based on that the driving speed deviation value increases above the threshold value in a state where the traffic situation type is the second type.

5. The apparatus of claim 4, wherein the first type includes a stable state type in which a traffic situation is smooth, the traffic situation being smooth in a state that a traffic congestion is not increased or is in a predetermined range, wherein the second type includes a traffic congestion increase type in which the traffic congestion is increased, and wherein the third type includes a smooth recovery type in which the traffic situation is congested and then is smooth.

6. The apparatus of claim 1, wherein the at least one processor determines that a traffic state is a smooth traffic state, based on that the driving speed deviation value is not less than a threshold value, and determines that the traffic state is a delay state, based on that the driving speed deviation value is less than the threshold value.

7. The apparatus of claim 1, wherein the at least one processor determines the traffic situation type based on that the driving speed deviation value, the average driving speed, and an actual traffic situation of the vehicles are entered through a first machine learning model, and wherein the actual traffic situation of the vehicles includes a number of times that the vehicles wait for traffic signals, and a speed of the vehicles based on not waiting for traffic signals.

8. The apparatus of claim 1, wherein the at least one processor corrects the first traffic information prediction result and generates the prediction traffic information based on that the first traffic information prediction result is different from the determined traffic situation type, and generates the prediction traffic information by use of the first traffic information prediction result based on that the first traffic information prediction result is not different from the determined traffic situation type.

9. The apparatus of claim 1, wherein the at least one processor outputs the prediction traffic information based on that the determined traffic situation type, a current average driving speed for the specified section, a past average driving speed for the specified section, and a future average driving speed for the specified section are entered through a second machine learning model.

10. The apparatus of claim 1, wherein the at least one processor determines a stop situation by a traffic signal, which is distinguished from an actual traffic congestion situation, by analyzing the driving speed deviation value of the vehicles and a change in the average driving speed of the vehicles.

11. The apparatus of claim 1, wherein the at least one processor utilizes the generated prediction traffic information as input data based on that predicting traffic information related to medium distance or a long distance longer than the medium distance.

12. The apparatus of claim 1, wherein the at least one processor predicts a remaining time, in which traffic congestion lasts, depending on a traffic congestion degree of the specified section based on that a traffic situation is a traffic congestion increase situation.

13. A method for predicting traffic information, the method comprising:

obtaining, by at least one processor, a driving speed deviation value of vehicles and an average driving speed of the vehicles based on vehicle data received from the vehicles driving in a specified section through a communication circuit receiving the vehicle data;

determining, by the at least one processor, a traffic situation type based on the driving speed deviation value and the average driving speed entered through a machine learning model; and generating, by the at least one processor, prediction traffic information based on the determined traffic situation type, wherein the generating of the prediction traffic information includes:

comparing, by the at least one processor, a first traffic information prediction result, which is obtained based on a history of a driving speed for the specified section, with the determined traffic situation type, after the traffic situation type is determined;

generating the prediction traffic information based on a result of the comparison; and displaying the prediction traffic information and the traffic situation type through a display.

14. The method of claim 13, wherein the obtaining of the driving speed deviation value of the vehicles and the average driving speed of the vehicles includes:

matching, by the at least one processor, a location of each of the vehicles with a link based on information related to the link of the specified section stored in a memory; and obtaining, by the at least one processor, the driving speed deviation value of the vehicles and the average driving speed of the vehicles based on the location of each of the vehicles.

15. The method of claim 13, wherein the traffic situation type includes a first type, a second type, and a third type, and wherein the determining of the traffic situation type includes:

determining, by the at least one processor, the traffic situation type as one of the first type, the second type, and the third type, based on a change in the driving speed deviation value and the average driving speed.

16. The method of claim 15, wherein the determining of the traffic situation type includes:

determining, by the at least one processor, the traffic situation type as the second type based on that the driving speed deviation value decreases below a threshold value in a state where the traffic situation type is the first type; and determining the traffic situation type as the third type, based on that the driving speed deviation value increases above the threshold value in a state where the traffic situation type is the second type.

17. The method of claim 16, wherein the first type includes a stable state type in which a traffic situation is smooth, the traffic situation being smooth in a state that a traffic congestion is not increased or is in a predetermined range, wherein the second type includes a traffic congestion increase type in which the traffic congestion is increased, and wherein the third type includes a smooth recovery type in which the traffic situation is congested and then is smooth.

18. The method of claim 13, further including:

determining, by the at least one processor, a stop situation by a traffic signal, which is distinguished from an actual traffic congestion situation, by analyzing the driving speed deviation value of the vehicles and a change in the average driving speed of the vehicles.

* * * * *